_United States Patent Office_

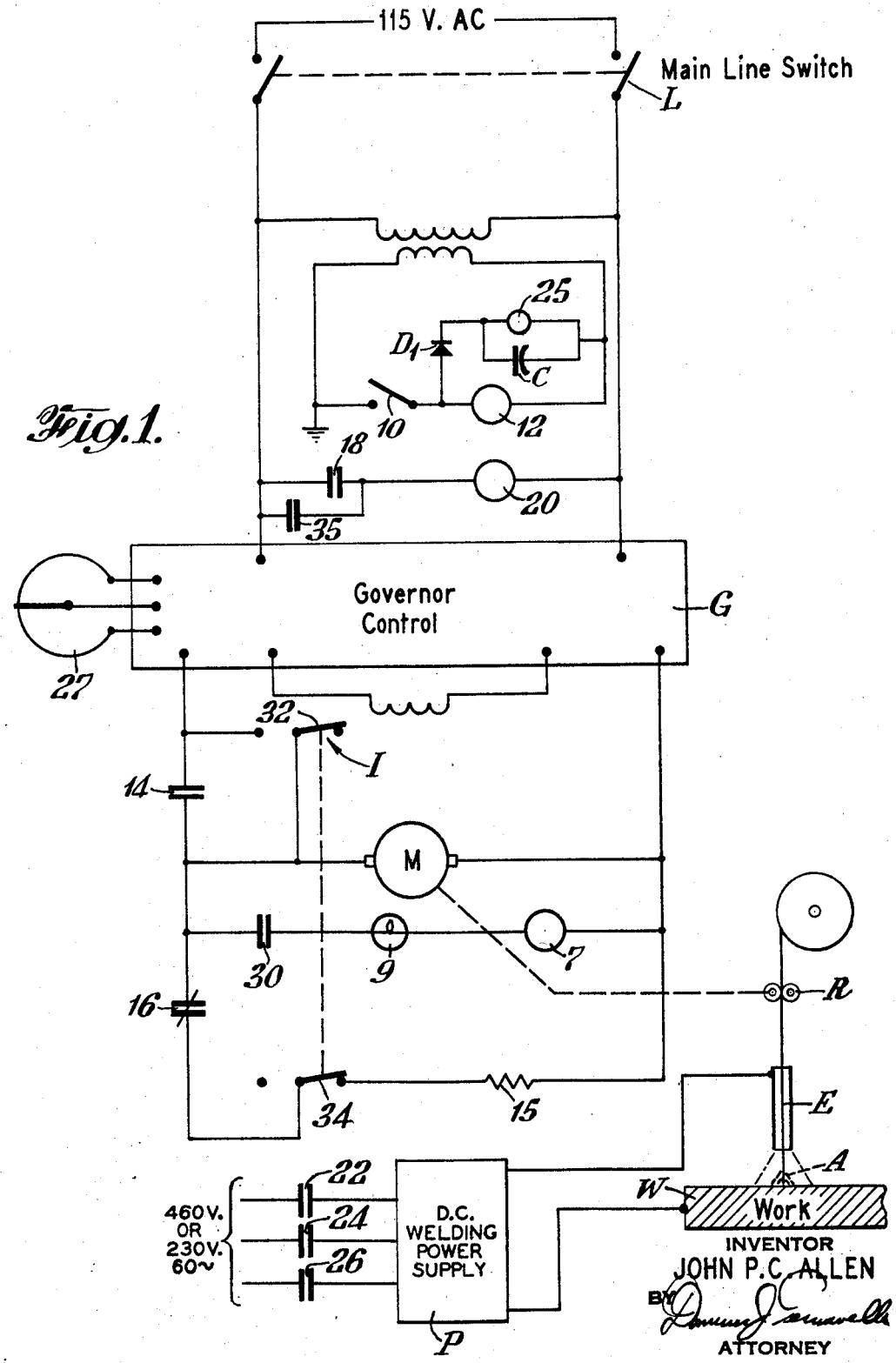

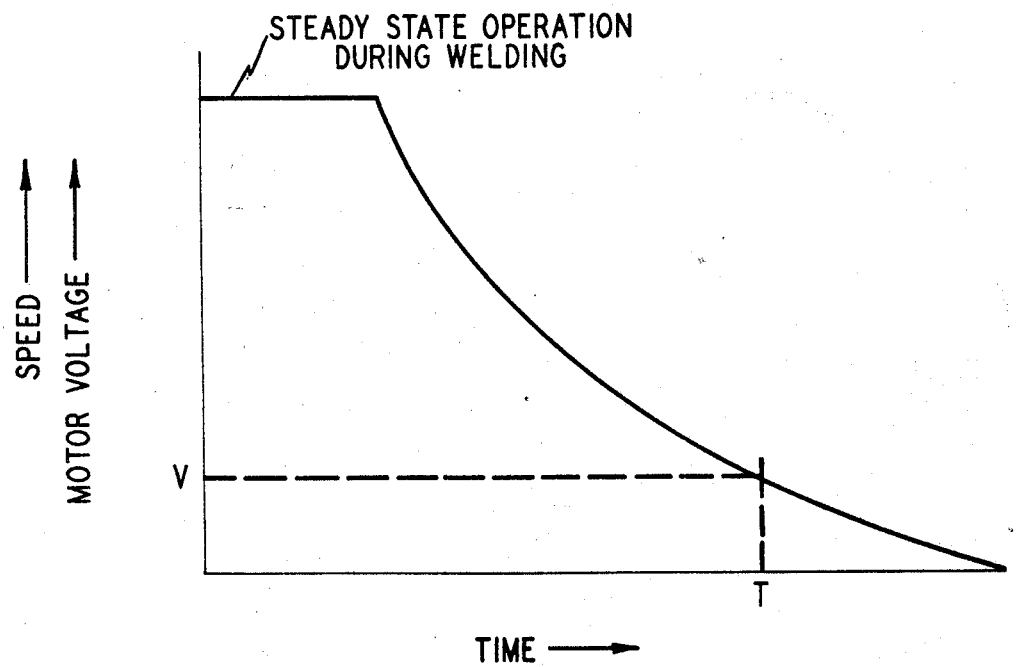

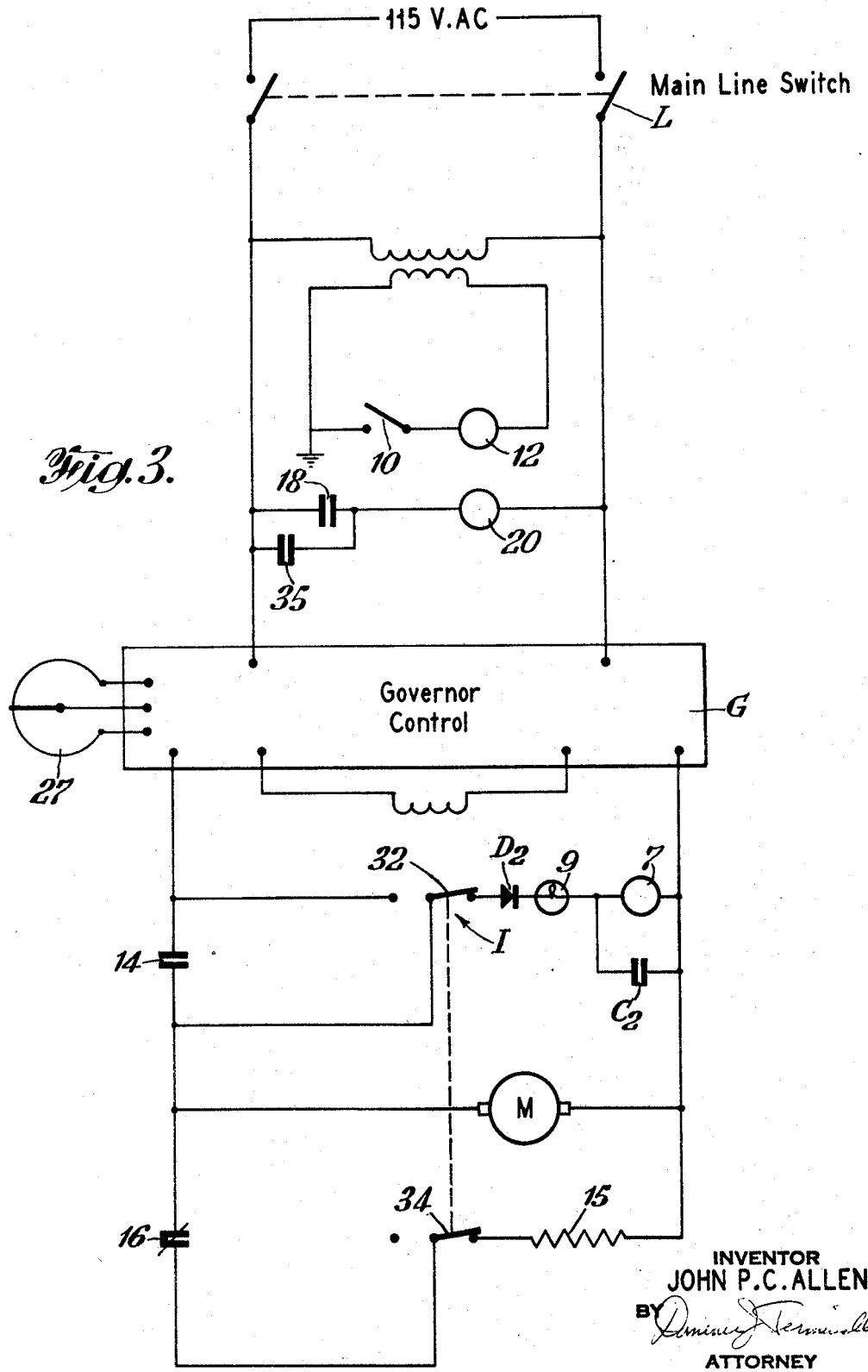

3,501,614
Patented Mar. 17, 1970

3,501,614
ANTI-STICK CONTROL CIRCUIT
John P. C. Allen, Fanwood, N.J., assignor to Union Carbide Corporation, a corporation of New York
Filed June 27, 1967, Ser. No. 649,247
Int. Cl. B23k 9/10
U.S. Cl. 219—131                                                               9 Claims

ABSTRACT OF THE DISCLOSURE

In an electric arc welding system having a motor of the constant field D.C. type for continuously feeding a consumable electrode into the arc comprising control circuitry including sensing means acting directly in response to the voltage developed across the motor for extinguishing the arc after a predetermined period of time has elapsed subsequent to completion of the weld.

---

This invention relates to continuously fed consumable wire electrode electric arc welding and more particularly to control circuitry for extinguishing the arc at the end of a welding operation.

After a weld has been completed in a consumable electrode welding process wherein the electrode is fed continuously from a reel a practical problem arises in terminating the welding operation. Should the wire feed control and arc power supply be turned off concurrently, the wire instead of coming to an immediate stop will continue on into the weld puddle and may freeze therein as the puddle solidifies. The continued movement of the wire is the result of the inertia of the motorized feed system which still retains momentum after deenergization.

To prevent this undesirable occurrence, the power supply is left on, sustaining the arc, while the wire feed control is shut off. The end of the wire will then continue melting into the weld puddle as the wire slows to a stop. However, leaving the power supply on indiscriminately after the wire feed control is turned off may cause the wire to burn back and fuse to the guide tube. Therefore, in welding with a consumable wire electrode it becomes important after the weld is completed to maintain the arc for a time long enough to prevent the electrode from penetrating the weld puddle hereinafter referred to as "electrode sticking," but short enough to prevent the arc from burning back to the guide tube, hereinafter referred to as "burn back."

Heretofore, this has been accomplished with a pneumatic time delay relay of the delay after deenergization type more commonly known to the art when employed to correct the above problem as an "anti-stick" time delay relay. A time delay relay of the delay after deenergization type, as its name implies pulls up its contacts when energized but takes a fixed time or delay time to release them when de-energized. The time it takes to release its contacts is variable and can be manually adjusted by means of an adjustment screw. The relay contacts are in circuit relation with the power supply such that the supply is cut off extinguishing the arc in a time fixed by the setting of the relay. The appropriate setting is determined by the welding operation employed, the size of the welding wire to be used, the wire feed rate and the welding current. Consequently, it is an empirical evaluation requiring a trial and error procedure prior to each different welding operation. Moreover, such a procedure is quite time consuming and is not in fact, entirely accurate. The art has long sought a solution to the problem of electrode sticking and burn-back which is not subject to the above disadvantages.

According, it is the primary object of this invention to provide control circuitry for preventing electrode sticking or burn back at the completion of the welding operation.

It is a further object to provide a simple inexpensive control which provides all of the advantages of the prior art control without any of its disadvantages.

Other objects and features of the invention will become apparent from a reading of the specification and from the accompanying drawings wherein:

FIG. 1 is a circuit wiring diagram illustrating one embodiment of the invention.

FIG. 2 is a graph illustrating the operation of the embodiment of FIG. 1.

FIG. 3 is a circuit wiring diagram of a second embodiment of the invention.

This invention takes advantage of the fact that in a wire feed driving motor of the constant field D.C. type, the voltage developed across the motor for a given field excitation is directly proportional to the motor speed of rotation. This voltage is, therefore, a direct indication of the wire speed during welding as well as during deceleration when the welding operation has been completed. For purposes of this invention disclosure a motor of the constant field D.C. type is intended to include shunt wound motors, separately excited motors and permanent magnets. The voltage developed across the wire feed driving motor is advantageously used as a control voltage for extinguishing the arc at the appropriate moment of time to eliminate electrode sticking and burn back. The appropriate moment of time can represent either a fixed time determined by a time delay circuit which is triggered by the developed voltage across the motor at the completion of the weld or a time when the voltage across the motor drops below some predetermined level.

Referring now particularly to the circuit of FIG. 1 in conjunction with the graph of FIG. 2. The circuit wiring system shown in FIG. 1 incorporates a D.C. welding power supply P which is voltage controlled or of constant potential type or current controlled or of conventional type. The welding power supply P is energized from a 460 v. or 230 v. 60 cycle 3 phase source. A welding power supply energized from a single phase source could also be employed. The wire feed driving motor M which drives the feed rolls R to feed wire to the work W is of the constant field D.C. type. The graph of FIG. 2 shows the voltage developed across motor M as a function of time from a steady state condition i.e. excluding the transient condition across the motor M when the welding operation is first started. Since the voltage developed across the motor M is proportional to speed, FIG. 2 is also a graph of wire feed speed as a function of time. The area under the curve represents the amount of metal being transferred to the weld. Let us now assume, for example, that at time T, equivalent to voltage V across the motor M, the arc A is designed to extinguish. The amount of metal that would be transferred to the arc subsequent to point T corresponds to the distance the wire overruns from the point the arc extinguishes. This distance is fixed regardless of the welding speed or wire feed speed at the end of the welding operation since the area under the curve from time T remains the same. Accordingly, if point T is properly chosen "electrode sticking" or "burn back" is not possible. Actually, a range of motor voltages exist for any particular welding operation any one of which may be used to control the termination of the arc to entirely avoid electrode sticking and burn back. A range of voltages exist since precise control of the distance the electrode drops from the guide tube at the end of the welding operation is not for present purposes a design criterion.

Turning now to a more detailed description of the operation of the circuit shown in FIG. 1. After the main line switch L has been closed the operator starts the welding operation by depressing external start stop switch 10. This instantly energizes weld-start relay 12, Normally open contact 14 of weld start relay 12 closes completing the circuit from the governor control G to wire feed driving motor M. Normally closed contact 16 of weld start relay 12 opens disconnecting the dynamic braking resistor 15 from across the driving motor M. Normally open contact 18 of weld start relay 12 closes energizing welding contactor relay 20. The energization of relay 20 closes its normally open contacts 22, 24, and 26 respectively, energizing power supply P. Motor M drives rollers R which in turn feed the wire electrode E toward work W at a speed determined by wire speed potentiometer 27. Welding wire E feeds down until it contacts the work W and then burns back to initiate an arc.

Across motor M and in parallel therewith is anti-stick relay 7 in series with ballast 9 and normally open contact 30 of auxiliary start relay 25. Auxiliary start relay 25 is in series with diode D1, the series combination being in parallel with the weld start relay 12. Directly across auxiliary start relay 25 is a capacitor C. The purpose of capacitor C will be discussed hereafter. Upon the energization of auxiliary weld start relay 25 normally open contact 30 closes completing the parallel circuit across the motor through ballast 9 and anti-stick relay 7. A voltage is instantly impressed across anti-stick relay 7 large enough to energize relay 7 closing its normally open contact 35. Contact 35 is connected across weld start relay contact 18 to provide a second electrical path for weld contactor relay 20.

Welding action is stopped manually by the operator when the start-stop switch 10 is opened. This acts to deenergize the weld start relay 12. Auxiliary weld start relay 25, however, does not de-energize until capacitor C is substantially discharged. Capacitor C is chosen of relatively large value in the range of 50 to 100 microfarads so that auxiliary weld start relay 25 remains energized until some time subsequent to the termination of the arc. Contact 14 of weld start relay 12 returns to its normally open position breaking the circuit between the governor control G and motor M. Contact 16 of weld start relay 12 returns to its normally closed position impressing the dynamic braking resistor 15 across motor M. The motor M now acts as a generator dissipating its energy through the braking resistor 15 while slowing to a stop. Contact 18 of weld start relay 12 returns to its normally open position. The on-off status of the power supply is controlled by contacts 22, 24, and 26 of the weld contactor relay 20 which is in series with contact 18. Contact 35 of anti-stick relay 7 is in parallel with contact 18 and performs a by-pass or holding function for weld contactor relay 20 and as such maintains the power supply in the on condition.

The voltage across the anti-stick relay 7 is proportional to the voltage across the motor M. As the voltage drops across motor M the relay voltage drops proportionally. When the voltage across relay 7 falls below its drop-out potential it will release contact 35 de-energizing weld contactor relay 20. Contacts 22, 24, and 26 will return to their normally open position de-energizing power supply P and extinguishing the arc A. Hence, for a chosen relay having a particular drop-out potential, the arc extinguishes in response to the voltage developed across the motor when it falls below a predetermined level. The predetermined level is equal to the drop-out potential of the relay 7 plus the voltage across ballast 9 when the drop-out potential across relay 7 is reached. The precise value of the predetermined level is unimportant for present purposes since the invention concerns solely the prevention of electrode sticking and burn back and not a precise evaluation of electrode extension at the end of the welding operation.

Anti-stick relay 7 is in series with ballast 9. Ballast 9 is not necessary to carry out the invention. However, if it were omitted anti-stick relay 7 would have to withstand the entire steady state voltage developed across the motor M during welding as well as possess a relatively low drop out potential. Although a relay can be designed with such characteristics, to do so would not be economically practical. Ballast 9 represents a non-linear resistor having the property of increased resistance with increasing voltage, which considerably reduces the voltage range impressed across anti-stick relay 7. Any resistor possessing this characteristic could be used equally as well in place of ballast 9. In fact, a linear resistor could also be used in place of ballast 9 but it would then only serve to reduce the operating voltage across the relay by a fixed amount.

An inching switch I is provided to feed wire without welding. The switch I has two ganged contacts 32 and 34. Contact 32 is connected in a normally open position across weld start relay contact 14. Contact 34 is in series with braking resistor 15. When the inching switch I is depressed motor M energizes through contact 32, while the braking resistor circuit is opened simultaneously through contact 34. The inching switch is spring loaded to return to its normal position upon being released. Normally open contact 30 in series with anti-stick relay 7 prevents any voltage build up across relay 7 during inching.

FIGURE 3 is a circuit diagram of another embodiment of the invention. The circuit is substantially identical to that of FIGURE 1 and therefore the numerals identifying the same components have been used. Here, however, one of the inching switch contacts, contact 32, is interposed in the anti-stick relay circuit in parallel with the motor. The anti-stick relay 7 is in series with ballast 9, diode D2, and normally closed inching switch contact 32, the series combination being connected in parallel with the motor M. Across anti-stick relay 7 is a capacitor C2. This circuit eliminates the need for auxiliary weld start relay 25, diode D1 and capacitor C of FIGURE 1.

Welding is accomplished in the same manner as described in FIGURE 1. The welding operator depresses external start-stop switch 10 instantly energizing weld start relay 12. Normally open contact 14 of weld start relay 12 closes completing the circuit from the governor to the wire feed driving motor M. Normally closed contact 16 of weld start relay 12 opens disconnecting the dynamic braking resistor 15 from across driving motor M. Normally open contact 18 of weld start relay 12 closes energizing welding contactor relay 20. The energization of relay 20 closes its normally open contacts 22, 24, and 26 respectively energizing power supply P to establish the arc.

Capacitor C2 charges to a voltage proportional to the voltage developed across the motor M. Capacitor C2 serves the purpose of directly energizing and de-energizing anti-stick relay 7. With anti-stick relay 7 energized normally open contact 35 closes performing the by-pass function for welding contactor relay 20 in the same manner as described heretofore in the operation of FIGURE 1.

When the welding operation is completed the operator manually opens the start-stop switch 10 de-energizing weld start relay 12 to thereby release weld start relay contacts 14, 16 and 18. Contact 14 returns to its normally open position breaking the circuit between the governor and motor M while contact 16 returns to its normally closed position connecting the dynamic breaking resistor 15 in circuit with the motor M. As the motor voltage decays, capacitor C2 discharges solely through anti-stick relay 7. Diode D2 prevents capacitor C2 from discharging through motor M. When the relay voltage falls below its drop out potential contact 35 of anti-stick relay 7 returns to its normally open position to de-energize weld contactor relay 20. Contacts 22, 24, and 26 of weld contactor relay 20 return to their normally open position de-energizing power supply P and extinguishing the arc A. Hence capacitor C2 in combination with antistick relay 7 acts as a time delay circuit responsive to the developed motor voltage to delay the de-energization of power supply P and thereby the arc A a predetermined period of time subsequent to the termination of the welding operation.

Inching switch contact 32 in FIGURE 3 is in series with the motor M and anti-stick relay 7 in a normally closed or at rest position. In the operated position contact 32 is connected to complete a circuit across weld start relay contact 14. Therefore, to inch, inching switch I is depressed throwing contact 32 into its operated position thereby short circuiting the weld start relay contact 14 and establishing an electrical circuit between the governor and motor M. Normally closed contact 34 of the inching switch I in series with the dynamic brake resistor 15 operates simultaneously with contact 32 disconnecting dynamic brake resistor 15 from across motor M. The inching switch I is spring loaded such that when released contact 32 will return to its at rest position connecting anti-stick relay 7 back in parallel relationship with motor M while contact 34 returns to its normally closed position to reconnect the dynamic brake resistor 15. Capacitor C2 slows the response of relay 7 so that relay 7 will not be energized by the voltage across the motor M at the instant inching switch I is released.

Although the invention has been described with reference to a relay for sensing the voltage developed across the motor it is not to be construed as limited thereto. Any means may be employed to sense the voltage developed across the motor for deenergizing the arc in a predetermined time period. Thus, known solid state devices such as, transistors, silicon controlled rectifiers and/or triacs may be utilized in place of or in combination with a relay for accomplishing the same result. The voltage developed across the motor may be used, for example, to fire the control gate of an SCR in a conventional manner to deactivate conductor 20 and extinguish the arc.

Obviously many other modifications and variations of the present invention are possible in the light of the present teachings without departing from the underlying scope of the invention.

What is claimed is:

1. In consumable electrode electric arc welding wherein the arc once established is maintained by a power supply in circuit relation with the electrode and the work while the electrode is fed continuously to the arc by a wire feed mechanism driven by a motor of the constant field D.C. type, said motor having in combination therewith: a first means electrically connected thereto and acting in response to the voltage generated by the motor; and a second means, said second means being actuated by said first means for interrupting the power supplied to the arc to extinguish it when the voltage generated by the motor drops below a predetermined level.

2. In electric arc welding as defined in claim 1 in which the first means comprises a relay connected in parallel with the motor.

3. In electric arc welding as defined in claim 2 wherein said relay is in series with electrical means having the property of increasing resistance with increasing voltage.

4. In electric arc welding as defined in claim 3 wherein said electrical means is a tungsten ballast.

5. In electric arc welding as defined in claim 1 wherein the second means is a relay contact of the first relay means and is connected in circuit relation with the power supply.

6. In an electric arc welding system comprising: a constant field D.C. motor for continuously driving a consumable metal wire to the arc where it is to be melted, and means responsive to the voltage generated by the motor for extinguishing said arc when said voltage drops below a predetermined level.

7. In a consumable wire electrode electric arc system comprising:
   an arc energizing circuit including an arc power supply connected in circuit relation with a consumable wire electrode and a workpiece;
   a wire feed mechanism, controlled by a constant field D.C. motor, for feeding said wire into the arc at a speed proportional to the voltage developed across said motor; and
   an arc de-energizing circuit responsive to the voltage generated by the motor for interrupting said arc energizing circuit after a predetermined period of time has elapsed subsequent to the completion of the weld, said predetermined period of time being dependent upon the magnitude of said generated motor voltage.

8. In an electric arc system according to claim 7 wherein said arc de-energizing circuit comprises a relay in series with a non-linear resistor the combination being connected in parallel with said motor.

9. In an electric arc system as defined in claim 8, said relay having a capacitor connected thereacross, said relay and said capacitor being connected in a parallel circuit in series with a unidirectional current device and said non-linear resistor.

References Cited

UNITED STATES PATENTS 3,054,885    6/1967    Lobosco et al. _____ 219—131

JOSEPH V. TRUHE, Primary Examiner
C. L. ALBRITTON, Assistant Examiner

U.S. Cl. X.R.
314—73